J. A. LONDON.
PHOTOGRAPHIC CAMERA.
APPLICATION FILED OCT. 4, 1915.
1,215,290.
Patented Feb. 6, 1917.
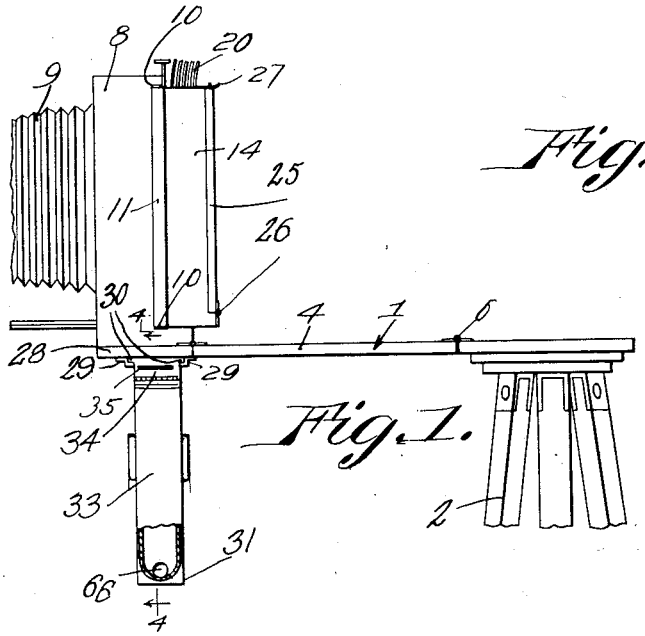
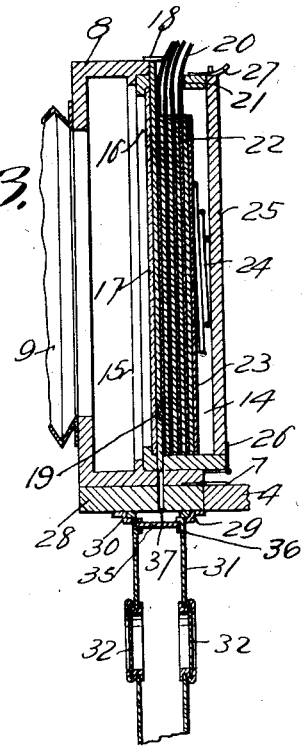
J. A. London, Inventor
by C. A. Snow & Co., Attorneys
Witnesses

UNITED STATES PATENT OFFICE.

JAMES A. LONDON, OF ELVINS, MISSOURI.

PHOTOGRAPHIC CAMERA.

1,215,290.   Specification of Letters Patent.   Patented Feb. 6, 1917.

Application filed October 4, 1915.  Serial No. 54,057.

*To all whom it may concern:*

Be it known that I, JAMES A. LONDON, a citizen of the United States, residing at Elvins, in the county of St. Francois and State of Missouri, have invented a new and useful Photographic Camera, of which the following is a specification.

The device forming the subject matter of this application is a photographic camera, and one object of the invention is to provide novel means whereby exposed plates or films may be ejected readily into a developing tank.

In the accompanying drawings:—

Figure 1 shows in side elevation, a photographic camera wherein the present improvements have been embodied;

Fig. 2 is a top plan of the structure shown in Fig. 1;

Fig. 3 is a vertical section taken through that portion of the camera wherein the plates or films are exposed;

Fig. 4 is a fragmental section on the line 4—4 of Fig. 1;

Fig. 5 is an elevation showing the pack inclosed within the casing, parts being broken away.

The camera forming the subject matter of this application embodies a platform denoted generally by the numeral 1 and adapted to be mounted upon a tripod 2 or be supported otherwise. The platform 1 preferably is a multi-part structure, embodying a section 3 and an end section 4, the section 3 being connected with the end section by means of hinges 6.

Through the instrumentality of hinges 7, a main casing 8 is attached to the end section 4 of the platform. The main casing 8 is provided with the usual appurtenances for exposing a plate or film, of which appurtenances the bellows 9 may be taken as typical and representative. To one rear, vertical edge of the main casing 8 is united by means of hinges 10, a focusing screen 11. To the other, rear vertical edge of the main casing 8 is detachably united by means of hinges 12, an auxiliary casing 14. The auxiliary casing 14 carries the films which are to be exposed and either the auxiliary casing or the focusing screen 11 may be swung into place at the rear of the main casing 8.

In its interior, the main casing 8 may be equipped with a rib 15 against which the auxiliary casing 14 abuts, the forward end of the auxiliary casing being equipped with a rib 16 holding in place a glass plate 17. The plate 17 is not a mandatory element, but it may be employed if desired, when films are to be exposed. Mounted to reciprocate vertically in the top of the auxiliary casing 14 is a slide 18 having one or more projections 19, the function of which is to engage with the films, when the slide is reciprocated, thereby to force an exposed film downwardly into the developing tank in a manner which will be understood clearly as the description of the invention progresses.

To the rear of the slide 18 are disposed opaque sheets 20 which may be made of paper, the upper ends of the sheets 20 projecting through an opening 21 fashioned in the top of the auxiliary casing 14. Interposed between the opaque sheets 20 are films 22. The numeral 23 indicates a backing plate engaged and pressed forwardly by a spring 24 attached to a lid 25 hinged as indicated at 26 to the bottom of the auxiliary casing 14 for vertical swinging movement, the lid 25 being maintained in a closed position by means of a latch 27.

To the bottom 28 of the main casing 8 are secured transverse guides 29 adapted to be engaged by ribs 30 on a developing tank 31, the construction being such that the developing tank may be slid readily to place beneath the bottom 28. The front and rear walls of the developing tank 31 are supplied with colored, translucent plates 32 through which the developing operation may be inspected from time to time. Attached to one end of the developing tank 31 is an upright spout 33, the upper end of which is closed by a hinged lid 34. In the end wall of the developing tank 31 near to the bottom of the spout 33 there is an opening 66 which establishes communication between the spout and the interior of the tank, so that developer poured into the spout will find its way into the tank. The top of the developing tank 31 is closed by a slide 35 which is removed during the developing operation, but is mounted in place when the tank is removed from the main casing 8, the slide 35 being mounted to reciprocate in guides 36 on the tank 31. In the bottom 28 of the main casing 8 and in the bottom of the auxiliary casing 14 are formed slots 37 disposed adjacent the slide 18 and forming a communication between the interior of the auxiliary casing and the developing tank 31.

The operation of the device is as follows:—

After a film 22 has been exposed, the slide 18 is depressed, the projections 19 thereof engaging the upper edge of the exposed film and thrusting the same downwardly through the slots 37 into the developing tank 31, the slide 35, of course, having been removed. The auxiliary casing 14 may then be swung to one side, its place being taken by the focusing screen 11, should a focusing operation be necessary. Thereafter, the auxiliary casing 14 is swung around into place to the rear of the main casing 1, one of the opaque sheets 20 is removed, the exposing and developing operations being repeated.

The spring 24 serves to advance the films and to maintain the same tightly compacted together, it being possible to swing the lid 25 rearwardly, to open the auxiliary casing 14 when it is desired to refill this element of the structure.

The word "plate" may be used in claiming the invention to designate any sensitized element, whether of glass or any other substance, and either flexible or inflexible.

As shown in Fig. 5, the pack is denoted by the numeral 100 and is inclosed within a casing 101 which may be paper or any other opaque substance. In practical operation, the cover 101 is severed along its edge, and that part of the cover which is disposed toward the lens of the camera is pulled out through the opening 21. When the slide 18 is reciprocated, the sensitized elements, one at a time will be ejected into the developing tank through the slots 37.

Having thus described the invention, what is claimed is:—

1. In a camera, a main exposing casing; a developing tank supported below the main casing; an auxiliary, plate holding casing movable with respect to the main casing and provided with a first opening, the auxiliary casing having a second opening communicating with the tank; plates mounted in the auxiliary casing; opaque sheets interposed between the plates, the ends of the opaque sheets projecting through the first opening in the auxiliary casing; a slide mounted to reciprocate in the auxiliary casing and constituting means whereby a plate may be ejected through the second opening into the tank when the slide is moved; and resilient, plate compressing means acting at an angle to the plane of reciprocation of the slide.

2. In a camera, a casing having an opening; a developing tank supported below the casing and provided with a spout, one end of the tank having an opening establishing a communication between the interior of the tank and the interior of the spout; a movable closure for the spout; a movable slide constituting a closure for the top of the tank; means for supporting a sensitized element in the casing above the tank; and means for expelling the sensitized element into the tank through the opening in the casing when the slide is removed.

3. In a camera, a casing; a developing tank; a pack of sensitized elements in the casing; means for exposing the sensitized elements successively; a slide mounted to reciprocate in the casing and constituting means for advancing the sensitized elements successively into the tank; and a covering inclosing the pack, whereby the same may be placed in the casing in daylight, the covering being severable along one edge of the pack, to permit the sensitized element to be ejected into the tank by the slide.

In testimony that I claim the foregoing as my own, I have hereto affixed my signature in the presence of two witnesses.

JAMES A. LONDON.

Witnesses:
R. J. WOOD,
J. E. ROLENS.